United States Patent [19]

Knoble et al.

[11] Patent Number: 4,691,341
[45] Date of Patent: Sep. 1, 1987

[54] METHOD OF TRANSFERRING DIGITAL INFORMATION AND STREET LIGHTING CONTROL SYSTEM

[75] Inventors: David W. Knoble, E. Flat Rock; Joseph W. Sanders, Flat Rock, both of N.C.

[73] Assignee: General Electric Company, Schenectady, N.Y.

[21] Appl. No.: 712,834

[22] Filed: Mar. 18, 1985

[51] Int. Cl.$^4$ .................................... H04M 11/00
[52] U.S. Cl. ............................ 379/97; 379/102; 375/49; 315/360; 315/361; 340/310 A; 340/825.44
[58] Field of Search .................. 179/2 A, 2 AM, 2 E, 179/2 EC; 340/825.44, 825.69, 310 R, 311.1, 310 A; 375/49; 315/360, 361; 379/96, 98, 97, 102, 104

[56] References Cited

U.S. PATENT DOCUMENTS

| | | | |
|---|---|---|---|
| 3,267,379 | 8/1966 | Bloxsom | 340/825.69 |
| 3,623,075 | 11/1971 | Bench | 375/49 X |
| 3,899,637 | 8/1975 | Willard et al. | 375/49 X |
| 4,007,450 | 2/1977 | Haibt et al. | 364/200 |
| 4,172,969 | 10/1979 | Levine et al. | 340/825.44 |
| 4,178,475 | 12/1979 | Taylor et al. | 179/2 EC |
| 4,178,476 | 12/1979 | Frost | 340/825.44 |
| 4,380,009 | 4/1983 | Long et al. | 340/825.44 |
| 4,442,319 | 4/1984 | Treidl | 340/310 R |

Primary Examiner—James L. Dwyer
Attorney, Agent, or Firm—John P. McMahon; Philip L. Schlamp; Ernest Legree

[57] ABSTRACT

Remote control of street lights utilizes a programmable computer which generates wavelike control signals at fundamental frequencies in the voice range and having half periods corresponding in time-duration to the pulses used for binary digits in logic circuits. The signals are transmitted by phone line to a shared paging transmitter which broadcasts them over the city. The signals are received by radio receives contained in local controller boxes from which the power lines to luminaires start out. The output of the receiver is driven to a saturating level in order to square off the received signals for a microcomputer programmed to decode the signals when they are legitimate and properly addressed to it. The microcomputer can turn the 230 v 60 Hz AC power line to the luminaires off or on, and can also turn on a local oscillator to inject an RF carrier signal onto the AC power line for energizing a dimming circuit in the luminaires.

11 Claims, 10 Drawing Figures

ADDRESS WORD

| 0 $A_3$ $A_2$ $A_1$ | 0 $A_3$ $A_2$ $A_1$ |

THE ADDRESS IS: $A_3 A_2 A_1 A_0$

FUNCTION WORD

| 1 $F_1$ $F_0$ $A_0$ | 1 $F_1$ $F_0$ $A_0$ |

THE FUNCTION IS: $F_1 F_0$

Fig. 2

ORGANIZATION OF INFORMATION

| 1011 | 1011 |

PROLOG WORD 1

| 1100 | 1100 |

PROLOG WORD 2

| 1010 | 1010 |

PROLOG WORD 3

| 1001 | 1001 |

PROLOG WORD 4

| 0000 | 0000 |

ADDRESS WORD
FOR ADDRESS 0

| 1010 | 1010 |

FUNCTION WORD
-- DIM (01)

| 0000 | 0000 |

ADDRESS WORD
FOR ADDRESS 1

| 1001 | 1001 |

FUNCTION WORD
- OFF (00)

| 0001 | 0001 |

ADDRESS WORD
FOR ADDRESS 2

METHOD OF TRANSFERRING DIGITAL INFORMATION AND STREET LIGHTING CONTROL SYSTEM

The invention relates to a novel economical method of transferring digital information between computers using only ordinary audio channels of communication, and to a system for the programmed control of city street lights.

BACKGROUND OF THE INVENTION

The invention was developed in response to a need for centralized remote control and dimming of street lights in metropolitan areas, and it will be described in conjunction with that application which is well illustrative of its utility. City street lights are frequently energized in groups of up to 50 on 230 volt, 60 Hz A.C. power lines. One or more such lines radiate from local controller boxes, of which there may be from a few hundred up to several thousand scattered throughout the city, depending upon its size. Typically, each controller box was originally equipped with a main breaker, a clock timer and on-off switches controlled by the timer. The timer may require periodiq resetting to assure accord with the seasonal changes in the hours of daylight and darkness, and there is no provision for dimming.

It is desired to replace the local control of street lights by remote control under a master controller in the form of a programmable computer at the utilities control center of the city. The control signals are to be transmitted by standard telephone line to a centrally located frequency-modulated paging transmitter operating in the UHF band, for instance at about 450 MHz. The paging transmitter is used primarily for paging and for voice messages to city employees, but the channel is to be shared by interspersing the signals for lighting control among the other messages.

The plan calls for modifying the local controller boxes by removing the clock timers and equipping them with FM receivers tuned to the paging frequency. Upon reception of an appropriate signal by the receiver, the 230 v, 60 Hz power line from the controller box to the street luminaires is to be turned off or on according to the signal. Dimming of selected luminaires is to be achieved by sending to them an appropriate signal causing dimming means to be switched into circuit with the lamp.

SUMMARY OF THE INVENTION

An object of the invention is to provide a new and economical method for the transfer of digital information between computers which uses only the ordinary audio or conventional telephone channels of communication and which is particularly sparing of equipment at the receiving end. Another object is to provide a reliable system for controlling a large number of street lights from a central location through digital messages interspersed among voice messages broadcast by a paging type transmitter.

In a control system embodying our invention, a master controller in the form of a programmable computer generates wavelike control signals at fundamental frequencies in the telephone voice range. These signals have half periods correspond in time-duration to the pulses used for binary digits in logic circuits and preferably they simulate sinusoidal waves. The signals are transmitted by conventional phone line to a paging transmitter which broadcasts them over the city. The signals are received by radio receivers contained in local controller boxes from which the power lines to luminaires start out. The output of the radio is driven to a saturating level in order to square off the received signals and make them acceptable to a microcomputer. The microcomputer is programmed to decode received signals when they are legitimate and properly addressed to it. Upon receiving such a message, the microcomputer will appropriately turn the 230 v 60 Hz AC power line to the luminaires off or on according to the message. The microcomputer may also turn on a local oscillator in the controller box which injects an RF carrier signal onto the AC power line. In the individual luminaires there is provided a carrier signal detector which responds to the carrier signal or tone by energizing a dimming circuit which reduces light output.

A modem or modulator-demodulator is normally used to connect one computer by ordinary telephone line with another computer similarly equipped. The modem converts outgoing pulses or bits into frequencies within the 300 to 3000 Hz range of conventional phone lines, and does the reverse for incoming signals. The foregoing system would, absent our invention, require a modem at each end, one at the utilities control center to couple the master programmable computer to the phone line going to the paging transmitter, and one in the local controller box to couple the receiver to the microcomputer. The digital information transfer method of the invention eliminates the need for modems and allows the microcomputer at the receiver to decode the signals directly while preserving the ability to use a shared audio channel.

In the preferred practice of our method, information is divided into logical words comprising a plurality of binary digits or bits, some of the bits serving as address bits and some serving as function bits. In order to avoid reaction to noise or to audio signals other than those of a legitimate message, a message is composed of logical words preceded by arbitrary prologue words which must be received before a message is decoded.

A unit of transmitted information is made up of one complete cycle of an electric wave. Three types of units are used, a start unit which always indicates the beginning of a word, a zero bit and a one bit. Electric waves of progressively shorter or longer period in the voice frequency range are used for the three types of units in the order named. A word comprises a start unit, preferably followed by a zero bit, and in any event followed by information bits, that is zero bits or one bits or combinations of 0 bits and 1 bits. At the sending end, by programming a computer to supply binary numbers corresponding to the instantaneous amplitude of the desired electric waves into a digital-to-analog converter at time intervals which are short relative to the period of the wave, the converter's output simulates the desired voice range waveforms. At the receiving end, the waves are squared and the second half only of each cycle is recovered and supplied directly to the receiving microcomputer which responds to the digital information contained in the waves.

DETAILED DESCRIPTION

Logical Arrangement of the Information

In a preferred practice of our method, the information is divided into logical "words" which are processed by the receiving microcomputer. A "word" as used herein comprises eight bits or binary digits of information, in similar fashion to a byte in the conventional computer glossary, and the term will have that meaning unless the context specifically indicates otherwise. For the present application, four bits would suffice but the possibility of error due to random noise, such as a noise pulse causing a "1" to appear where a "0" was intended, must be allowed for. For conventional error correction using the Hamming code, in order to send four bits with error correcting requires seven bits, or eight bits if parity is included. We chose instead to use eight bit "words" comprising two identical half-words or "nibbles" of four bits each. The four bits of the second nibble are redundant and simply repeat the information in the four bits of the first nibble, but a word is not accepted as valid unless this occurs. By so doing the considerable programming cost of conventional error correction is avoided and adequate reliability is achieved by verification through redundancy.

Figure 1:
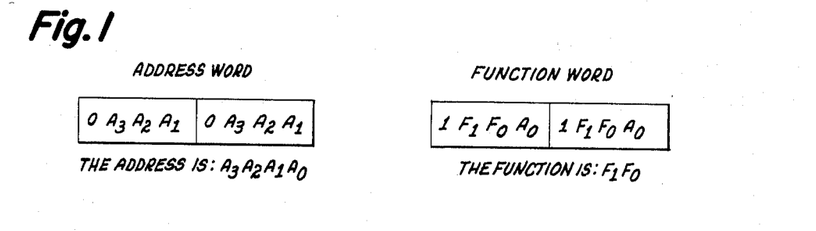
FIG. 1 illustrates an address word and a function word.

Our application may require the computer to recognize four address bits providing a total of $2^4$ or 16 addresses; and two "function" bits, namely turn on or off, and dim or not dim. Accordingly a total of six bits of information must be transmitted. This is done by using two "words" in the following manner as illustrated in FIG. 1. The first word is the "address" word in whose first nibble the first bit is a "0", followed by the three most significant bits of the address, that is the three leftmost (as seen in FIG. 1) of the four address bits, indicated $A_3$, $A_2$ and $A_1$. These four bits are then identically repeated for redundancy verification in the second nibble.

The second word is termed the "function" word, though it does contain a minor part of the address in addition to the function. Its first bit is a "1", followed by two function bits, indicated $F_1$, $F_0$, and the last bit, indicated $A_0$, which is the rightmost address bit and completes the address. The initial "0"or "1" bit identifies the word as an address word or function word so that the microcomputer can maintain word-synchronization in a noisy environment. If a burst of noise inhibits reception of a word, the computer will recognize the next word as either an address word or a function word; if the next word is not an address word, the computer will await the next word pair beginning with an address word before processing the information. Thus only correct pairs of words as illustrated in FIG. 1 will be recognized.

Figure 2:
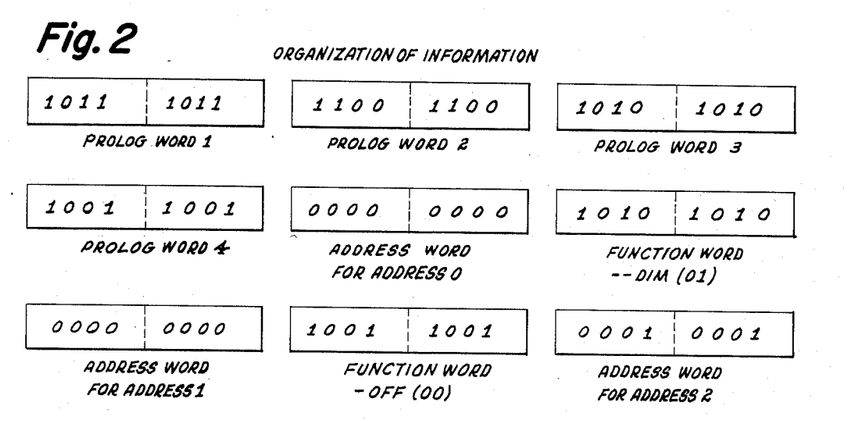
FIG. 2 illustrates the the organization of information in prologue words followed by address words and function words.

The system must not react to noise, voice, music, or audio signals other than a legitimate message. Since the digital information is sent on a shared audio channel, the need to prevent "falsing" on other audio signals is vital. Falsing occurs when the microcomputer interprets ordinary audio information such as voice or music as a legitimate signal. A message is verified and falsing is prevented by requiring that a message composed of words begin with four "prologue" words as illustrated in FIG. 2. These words have the first or synchronization bit as a "1" and are arbitrary as to the remainder. Unless these four prologue words are received, a message will not be processed. Thus, a particular sequence of 32 information bits (4 words × 8 bits per word) must be received before a message is accepted and acted upon. Further, if the computer reads more than a given number of bits or pulses, suitably 20, which are neither "1" nor "0" and therefore "bad", it will end the reception mode of action and again require the prologue to be sent. In this way, it is made extremely unlikely that normal voice transmissions will be interpreted as digital information.

The falsing rate of the foregoing algorithm has been tested in ordinary speech or audio communications by detecting receptions of the first prologue word alone; receptions of the first prologue word followed by the second prologue word within 20 bits or pulses; and receptions of the first prologue word, followed by the second prologue word within 20 bits, followed by the third prologue word within 20 bits etc. For testing purposes, it is assumed that unless all four prologue words occur in succession, "falsing" has occurred. The frequency of illegitimate reception of the first prologue word (from noise, speech etc) has been determined to be about one falsing per hour, and of the first two prologue words, about one falsing per month. In three months of testing there has yet been no reception of the first three prologue words as a falsing. Accordingly the possibility of reception of all four prologue words as a falsing is vanishingly small and is considered non-existent.

Physical Construction of the Signal

A unit of transmitted information in preferred practice of the invention, is made up of one complete cycle of some frequency. Three types of units are used: a start unit, a zero bit, and a one bit. The start unit indicates the beginning of a word; the zero and one bits represent a "0" and a "1" respectively in binary count. The start bit indicates to the microcomputer that a word is beginning, thus preserving synchronization of word reception. When noise occurs during the reception of a word, since the microcomputer can detect the beginning of a word, it ignores the interrupted word pair and reads the next pair of words. The half periods allocated to these functions are 730±100 μsec., 530±100 μsec., and 350±90 μsec. for the start, zero, and one bits respectively. They correspond to frequencies of approximately 685 Hz, 943 Hz, and 1428 Hz, respectively.

Phase Shifts

Figure 3:
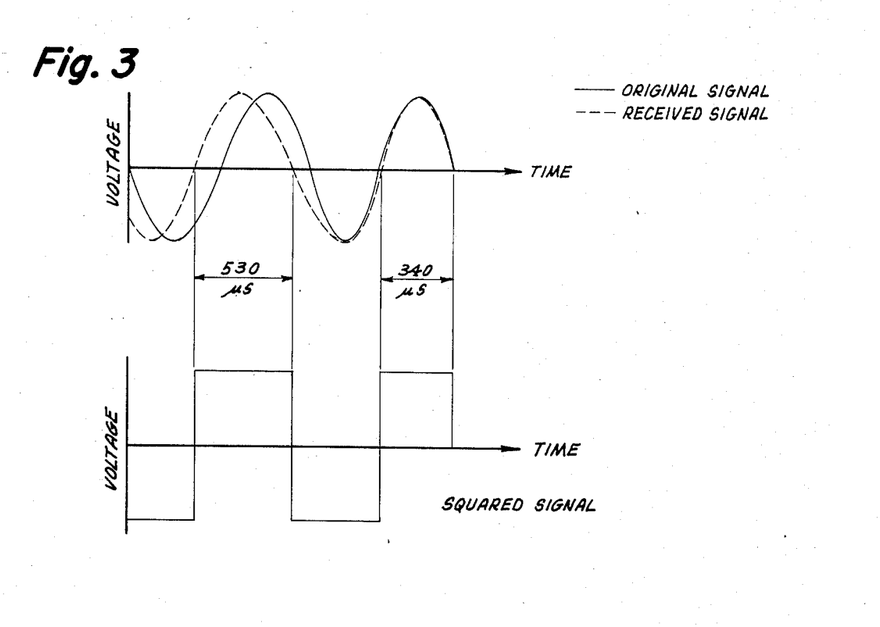
FIG. 3 shows the distortion in waveform caused by phase shifts in the communications channel.

Conventional communication channels use band-pass filters which cause phase shifts in signals to an extent dependent on frequency. Thus, while the controller generates one complete cycle of a voltage or current signal beginning and ending at zero, phase shifts occurring in the communications channel and primarily in the telephone amplifier and radio transmitter amplifier will destroy this symmetry. This is illustrated in FIG. 3 wherein the original signal is shown in a solid line and the received signal in a dashed line, the first half-cycle being the negative excursion. The received signal after squaring is shown below. The first half-cycle is always more distorted by the signal that preceded it than the second, as appears from the near-equality of the time-duration in the original and received second half-cycles.

Figure 4:
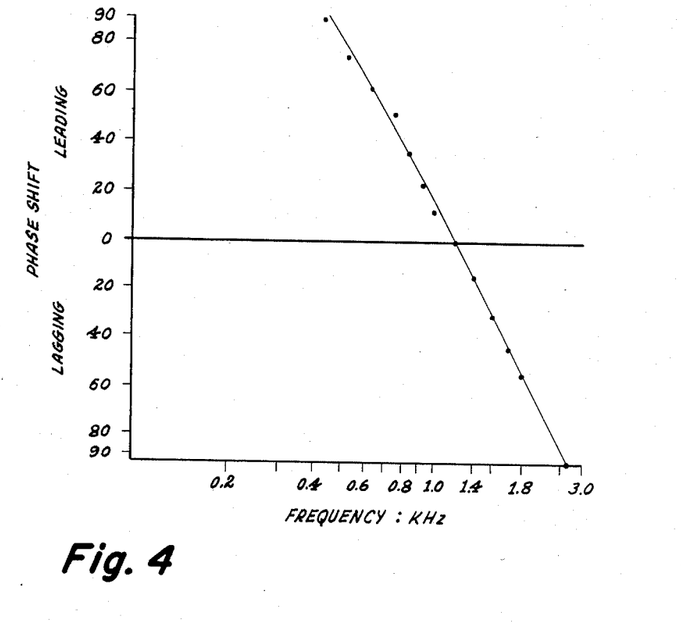
FIG. 4 is a plot of phase shift versus frequency in a conventional telephone desk set.

It is the ambiguity in signals caused by phase shifts in communication channels which has led to the choice of frequencies given earlier. Higher frequencies have the disadvantage of poorer accuracy of measurement by the receiving microcomputer due to finite instruction times of the microcomputer, and of poorer reception in the radio receiver. Lower frequencies avoid those disadvantages but suffer the disadvantage of relatively high phase shifts. By way of example, the phase shift at 500 Hz in a typical telephone desk set is 79°, as shown in the plot of phase shift versus frequency in FIG. 4. Several of these desk set amplifiers may be used on a single channel. The frequency range selected represents a compromise between these conflicting advantages and disadvantages.

Word Construction to Compensate for Phase Shift

In order to minimize the effects of the phase shifts, two measures are taken. First, the microcomputer is made to respond to the second half-cycle only of the bit and not to the first half-cycle which is more distorted in time-duration or period by the phase shifts. Second, every 8 bit word is preceded by a start unit followed immediately by a 0 bit. The presence of the zero bit minimizes the phase shift distortion which may occur following the start unit. If the start unit were followed by a 1 bit, the wave distortion in changing from the 700 Hz frequency of the start unit to the 1400 Hz frequency of the 1 bit would be excessive. Accordingly a word signal comprises 10 units, a start unit, followed by a 0 bit, followed by the 8 information bits shown in FIG. 2 which make up the word proper. A word signal has a time-duration of about 8 to 11 milliseconds, depending upon its content of 0 and 1 bits.

Figure 5A:
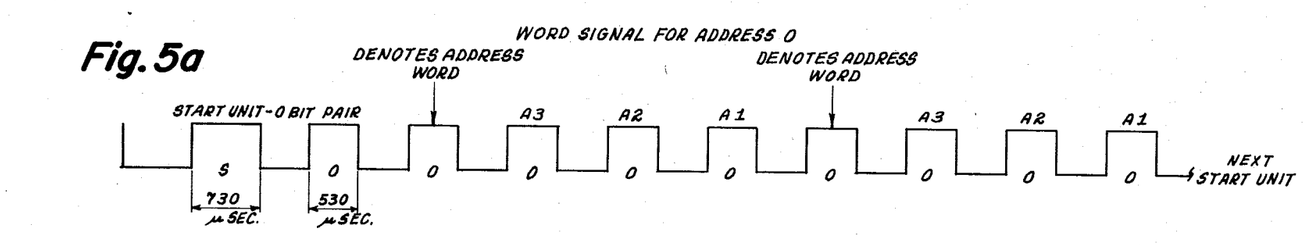
FIGS. 5a and 5b show respectively the word signal for address O and that for function DIM at address O.
Figure 5B:
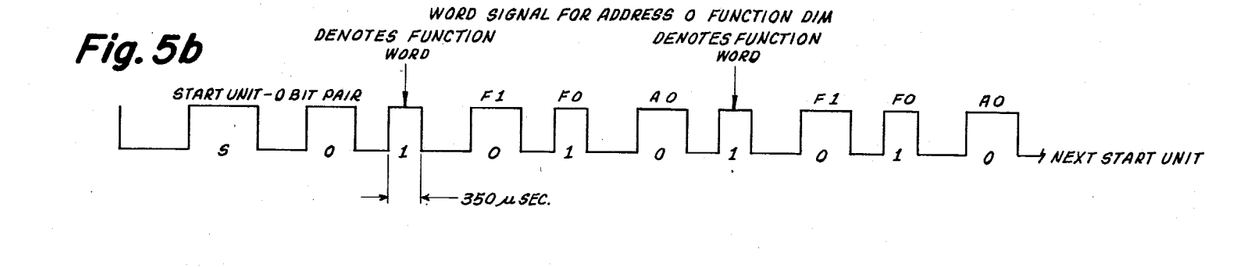

Word signals constructed in accordance with the foregoing principles are illustrated in FIGS. 5a and 5b. FIG. 5a shows the word signal for the address word for address O (middle word of center column in FIG. 2). It begins with a start unit, followed by a 0 bit, followed by eight 0 information bits. FIG. 5b shows the word signal for the function word for address O and function "dim" (middle word of right column in FIG. 2). It also begins with a start unit followed by a 0 bit, but the eight information bits are alternating 1 and 0 bits.

Message Construction

Before a message consisting of a collection of words beginning with the 4 prologue words is sent, a leader of about ¼ second duration and consisting entirely of start units (frequency 685 Hz) is sent. The leader allows time in which to prepare the channel, such as time for capacitors to charge, for the receiver's AFC (automatic frequency control) to stabilize, etc. Since the leader consists entirely of start units, when stabilization has occurred, the microcomputer is ready to receive valid information. Finally, after all the words have been sent, it is necessary to force the microcomputer back to the initial mode in which it is searching for the prologue, as otherwise it could "false" on a subsequent audio message. This is accomplished by a trailer (opposite of leader) of about 100 milliseconds (ms) duration consisting of 50 cycles of 500 Hz. The microcomputer interprets these cycles as non-message cycles, and 20 such cycles will force a return to the initial mode. It should be noted that in a word signal, the start unit followed by a 0 bit which precedes an 8 bit word is validated but not processed by the receiving micro-computer. Its presence gives the microcomputer time to perform any housekeeping tasks such as incrementing or clearing out counters or determining word validity after the word is received.

Figure 5C:
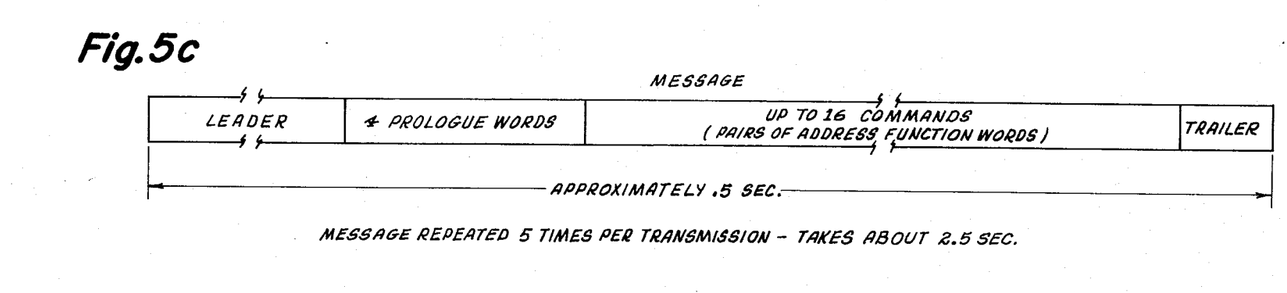
FIG. 5c indicates the time-duration of component parts in a complete message.

FIG. 5c illustrates approximate time durations of the various elements or parts in a message, beginning with the leader (250 ms), followed by the 4 prologue words (40 ms), then the commands (up to 16 commands at 10 ms per command) and finally the trailer (100 ms). In a system which we constructed and tested, we provided for 16 addresses but actually used 14, so 14 commands or pairs of address function words were transmitted in a message. The time duration of a message providing a command to all 16 addresses is about ½ second. The transmitting schedule used was to send a message repeated 5 times, to all controller boxes in the city at approximately ¼ hour intervals. This required from 2 to 3 seconds of transmitting time on the paging transmitter at 15 minute intervals, leaving it available for normal paging and communications the rest of the time.

Figure 5D:
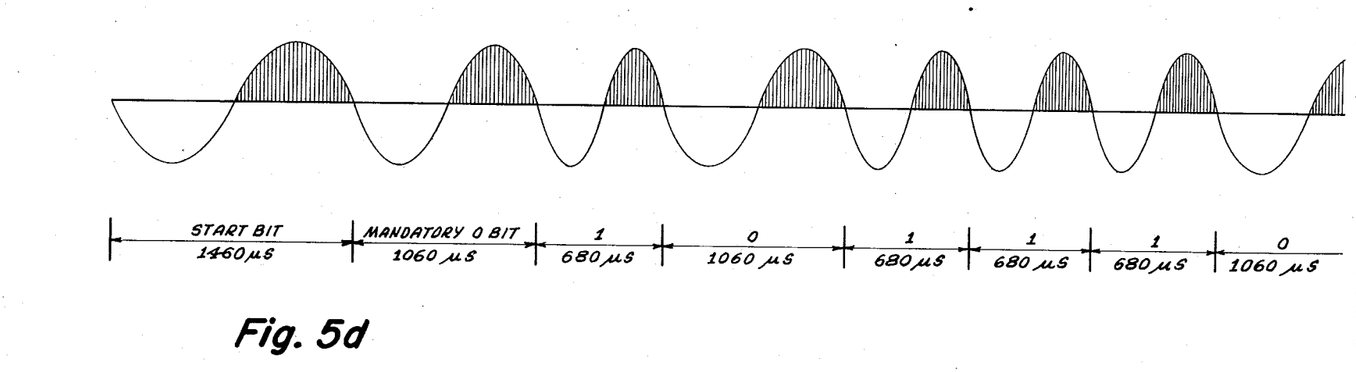
FIG. 5d shows the initial part of a transmitted waveform corresponding to an analog word.

FIG. 5d illustrates the actual waveforms transmitted through the audio channels for a portion of a word. At the receiver, the upper cross-hatched portion is squared by driving to saturation and that is the portion that goes to the microcomputer.

Lighting Control System

Figure 7:
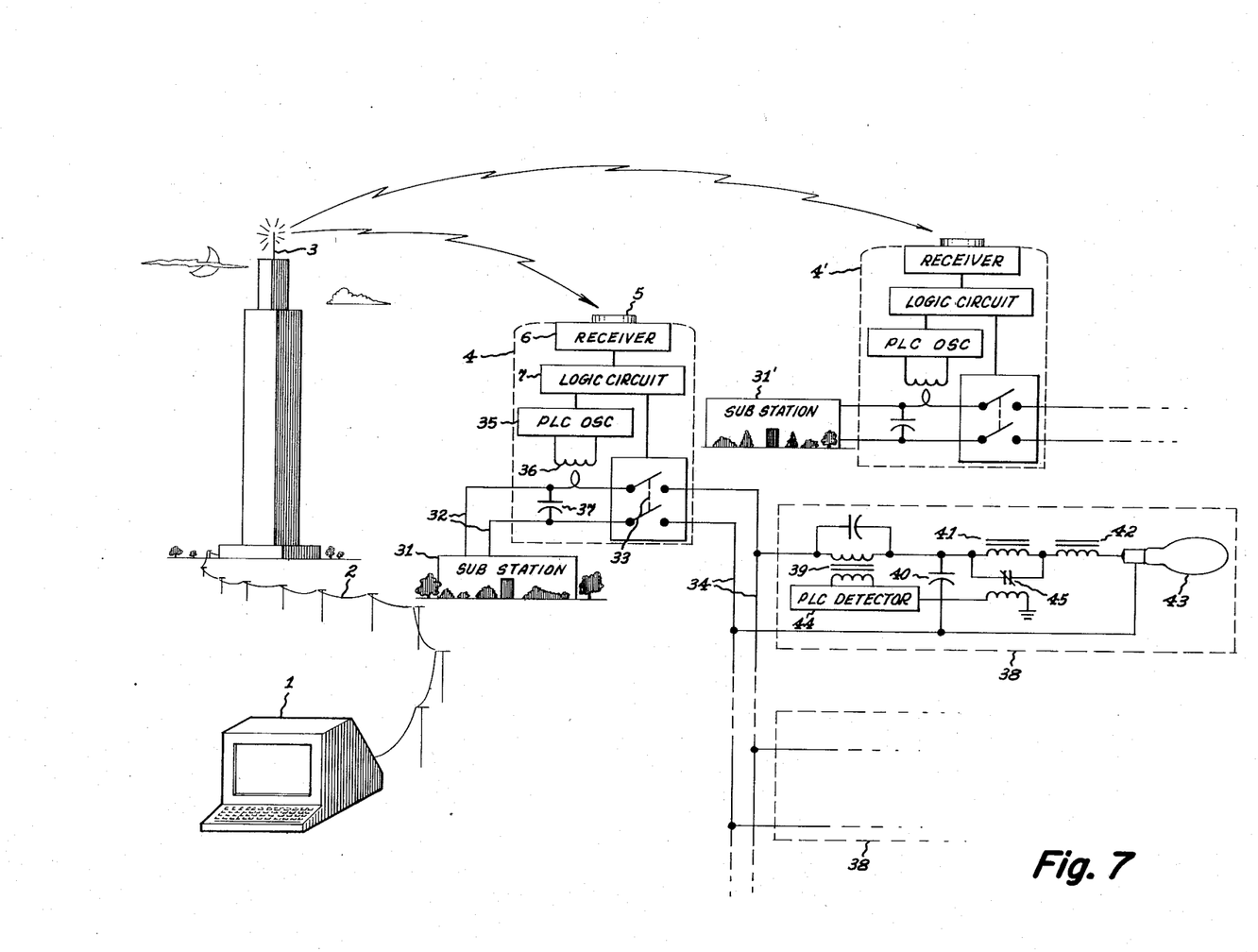
FIG. 7 is a diagrammatic representation of a programmable central street light control system utilizing our invention.

A lighting control system for a metropolitan area embodying the invention is schematically shown in FIG. 7. A master controller or programmable computer 1 at the utilities control center has a routine or sub-program which converts the start, 0, and 1 units into simulated sinusoidal signals whose periods correspond to the duration of the respective units. This may be done by using a look-up table and writing the instantaneous amplitude to a digital-to-analog converter. These signals are amplified to the extent required, suitably by a desk set, and transmitted by conventional phone line 2 (usually underground cable in a city) to the paging transmitter 3, preferably located at a high elevation in a central location. The paging transmitter provides adequate signal strength to reach all the receivers in the area, the receivers being located in the converted lighting controller boxes 4,4' scattered throughout the city.

A typical local controller box, may be equipped with a vandalism-resistant antenna 5 of low profile, such as disclosed and claimed in the similarly assigned copending application of Alan M. Smith, Ser. No. 712,053, filed Mar. 15, 1985, entitled Vandalism-Resistant UHF Antenna. The receiver 6 may be a conventional FM radio in the 450 MHz range whose output is driven to a saturating level in order to square off the received signals and make them acceptable to a logic circuit 7, suitably a micro-computer such as an Intel 8048. The logic circuit or micro-computer is programmed to decode received signals which have been logically organized and physically constructed as previously described herein.

Flow Chart

Figure 6:
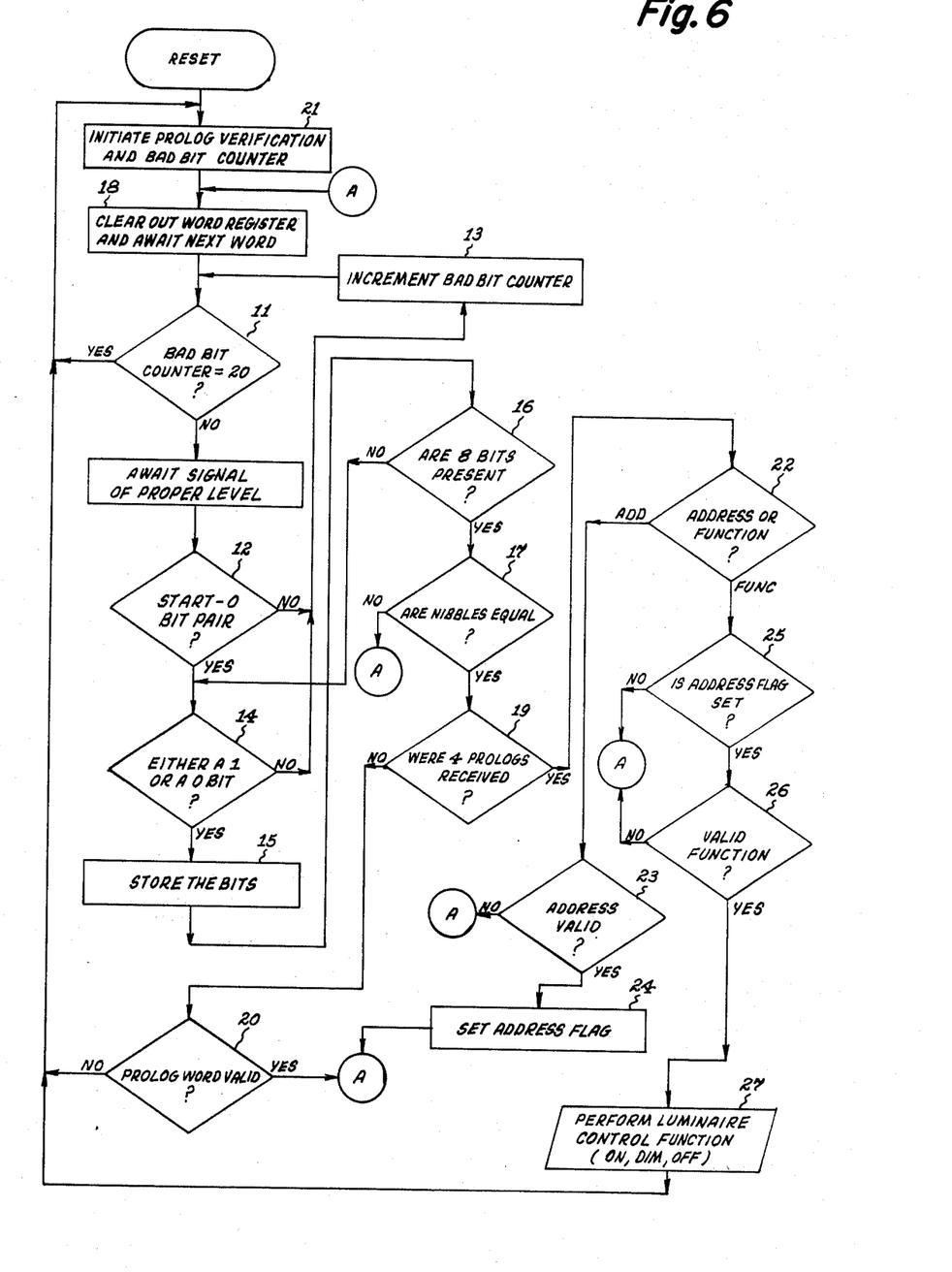
FIG. 6 is a flow chart illustrating suitable programming of a microcomputer at the receiving location.

A simplified flow chart of suitable programming for the receiving microcomputer 7 is shown in FIG. 6 wherein all the points labeled A are to be deemed joined. As part of the message verification procedure, at the first decision point indicated 11, the computer determines whether the number of "bad" bits or pulses received has attained 20; if "yes", the computer will require reception of the 4 prologue words again before accepting a message; if "no", the computer continues to verify received information. At decision point 12, the computer determines whether the duration of the received signal indicates a start-0 bit pair; if "no", the bad bit counter 13 is incremented; if "yes", processing continues. At decision point 14, the computer determines whether the pulse is of proper duration for a 1 or a 0 bit. If the pulse is not of proper duration for either, bad bit counter 13 is incremented. If the bit is of proper duration, it is stored at 15 and the computer determines at decision point 16 whether 8 bits have been received. If "no", the computer will loop back and the verification on the 1 and 0 bits is continued at decision point 14. The looping continues until 8 bits have been stored. At decision point 17 the computer determines whether the nibbles are equal. If "no", the word is invalidated by clearing out the word register 18 and message reception starts over. If "yes", the computer determines at decision point 19 if 4 prologue words have been received. Until 4 prologue words have been received validation of incoming prologue words is made at decision point 20. If the word is not a valid prolog word, any accumulated sequence of prologue words is cleared out and the prologue verification is started over at 21.

Once the computer has verified that 4 prologue words have been received, it determines at decision point 22 whether a word is an address or a function word. If the word is an address word, the computer will determine at decision point 23 whether the incoming address is that to which the local controller is set (out of a possible choice of 16). If "no", the computer clears out the word register at 18 and awaits the next word. If "yes", the address flag at 24 is set before the computer clears out the word register at 18.

If the received word at decision point 22 was a function word, the computer checks at decision point 25 whether the address flag has been set. If "no", the word register at 18 is cleared and the next word is awaited. If "yes", the computer determines at decision point 26 whether the received function word is valid. If "no", the word register at 18 is cleared and the next word is awaited. If "yes", depending on the message and whether it calls for a change from an existing state, the computer may cause some of the various functions indicated at 27 to be performed. These functions involve turning the luminaires on or off and dimming them. The computer is then reset by initiating prolog verification at 21 and clearing out the word register at 18 and the various counters to wait the next message.

Referring to FIG. 7, the various local controller boxes 4 are supplied with 230 v, 60 Hz A.C. power from a substation 31 by a feeder lines 32. The line may include various breakers and protective devices (not shown), and continues through a control switch 33 into a power line 34 supplying up to 50 street lighting luminaires. The switch 33 is turned on or off by the logic circuit or microcomputer 7 in accordance with received commands. A power line carrier oscillator circuit 35 contained within the controller box can be turned on or off by the microcomputer to dim the luminaires. It is arranged to couple an RF carrier signal or tone, for instance a 200 KHz 5 v signal into the power line through an RF coupling loop or transformer 36. A capacitor 37 connected across the line on the substation side of the loop compels the RF signal to travel in the opposite direction, that is toward the luminaires.

The lamp operating and dimming circuit within each luminaire may be as shown in simplified form within dashed rectangle 38. A tuned pick-off transformer 39 is connected in series with power factor correcting capacitor 40, and also in series with dimming reactor 41, ballast reactor 42, and discharge lamp 43 across the line. It couples the RF signal from the line to power line carrier (PLC) detector circuit 44. When the carrier signal is received, the detector circuit causes the normally closed contacts of relay 45 to open, thereby putting dimming reactor 41 effectively in series with ballast reactor 42 and dimming the lamp. A suitable lamp operating and carrier signal coupling and detector circuit is described in the copending application of James H. Hardy, Daniel V. Owen and Candler A. Willis, Ser. No. 713,218, filed Mar. 18, 1985, entitled "Coupling of Carrier Signal from Power Line" and similarly assigned, and reference may be made thereto for further details.

While the invention, both as regards the method of transferring digital information between computers, and as regards a system for the programmed control of electric lamps, has been described in detail with reference to its application to the remote programmed control of street lights within a metropolitan area by radio, it will be understood that the particular steps and algorithm together with the specific program which has been described are intended as illustrative examples of the invention. Likewise the specific equipment and circuits described with respect to the control system are merely representative of many which may utilize the principles of the invention. It is therefore desired that the invention be limited only by the appended claims which are intended to cover such modifications and variants as those skilled in the art would ordinarily be apt to make based on our teachings and the examples which we have described.

What we claim as new and desire to secure by Letters Patent of the United States is:

1. A method of transferring digital information from a transmitting computer to a receiving computer which uses ordinary audio channels of communication comprising:

generating wavelike control signals having first and second half periods with each of the second half periods corresponding in time-duration to the pulses or bits used for binary digits in logic circuits, only said second half periods signals being organized into logical words representing the digital information, transmitting said wavelike control signals by ordinary audio channels of communication to a receiver, and supplying only said second half periods of said signals to said receiving computer.

2. The method of claim 1 wherein said wavelike control signals have progressively varying periods with which to form in the order named start units indicating the beginning of a word, and information bits comprising 0 bits and 1 bits conveying information.

3. The method of claim 2 wherein all words include a start unit indicating its beginning followed by at least one of said information bits.

4. The method of claim 3 wherein the start unit indicating the beginning of a word is always followed by a 0 bit thus making a start-0 bit pair, and said start-0 bit pair is followed by more than one of said information bits organized into logical words.

5. The method of claim 4 wherein some of the words are address words and others are function words, and wherein the receiving computer is programmed to respond to a function word only when said function word is joined to a particular address word.

6. The method of claim 5 wherein the address function words are preceded by several arbitrary prologue words, and wherein the receiving computer is programmed to respond to the address function words only when they are preceded by said prologue words whereby to avoid response to signals other than those of a legitimate message.

7. The method of claim 6 wherein 8 information bits are used per word, each word comprising two nibbles of 4 bits, and the 4 bits of the second nibble being redundant and simply repeating the information in the 4 bits of the first nibble to provide word verification through redundancy.

8. The method of claim 1 wherein said control signals have fundamental frequencies in the voice frequency range.

9. The method of claim 1 wherein the second half period is squared before it is supplied to the receiving computer.

10. A system for remote control of street lights over an area comprising:
a programmable computer generating wavelike control signals at fundamental frequencies in the telephone voice range, said signals having first and second half periods with each of the second half periods corresponding in time-duration to the pulses or bits of binary digits in logic circuits only said second half periods signals being organized into logical words representing the digital information,
means for transmitting said wavelike control signals by ordinary audio channels of communication,
local receivers in said area receiving only said second half periods signals and including means for squaring-off the received said second half periods signals,
local microcomputers receiving said squared-off signals, each microcomputer being programmed to respond to said signals only when they are legitimate and addressed to it, and
local means controlled by local microcomputer for turning street lights off and on, and for dimming them.

11. A system for remote control of street lights over an area comprising:
a programmable computer generating wavelike control signals at fundamental frequencies in the telephone vice range, said signals having half periods corresponding in time-duration to the pulses or bits of binary digits in logic circuits,
means for transmitting said signals by ordinary audio channels of communication, including a telephone line and a shared paging transmitter used primarily for paging and voice messages,
local receivers in said area receiving said signals and including means for squaring-off the received signals,
local microcomputers receiving said square-off signals, each microcomputer being programmed to respond to said signals only when they are legitimate and addressed to it, and
local means controlled by the local microcomputer for turning street lights off and on, and for dimming them.

* * * * *